Figure 1:
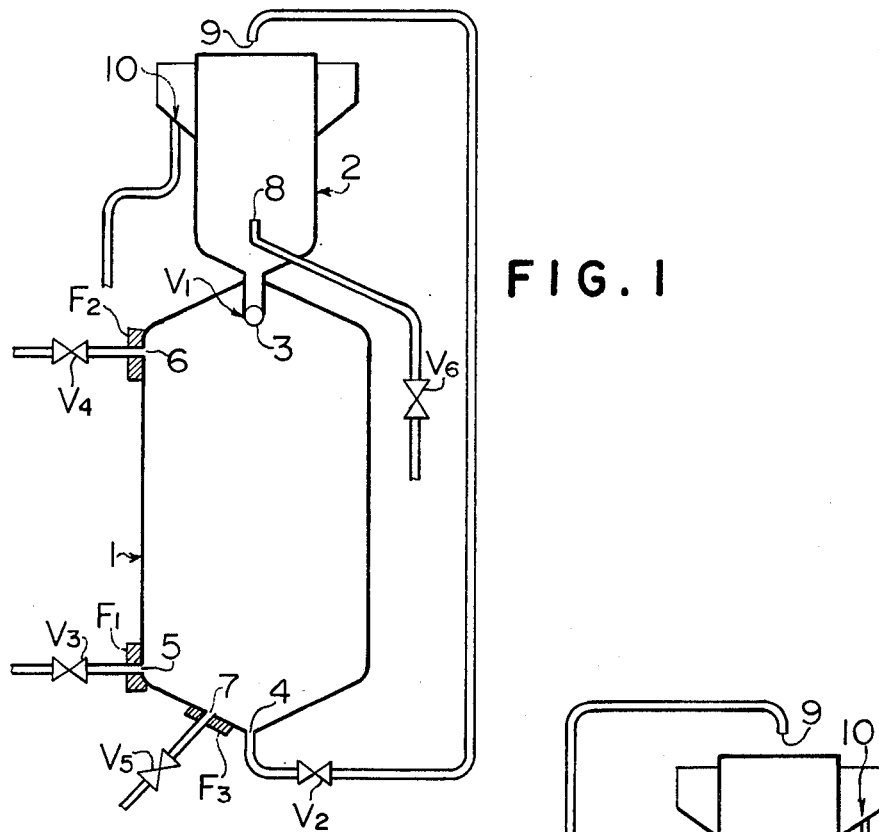

United States Patent [19]

Misumi et al.

[11] 4,085,042

[45] Apr. 18, 1978

[54] SOLID-FLUID CONTACTING PROCESS

[75] Inventors: Teruyuki Misumi; Toshio Miyaji; Masao Kasai, all of Yokohama, Japan

[73] Assignee: Asahi Kasei Kogyo Kabushiki Kaisha, Osaka, Japan

[21] Appl. No.: 697,117

[22] Filed: Jun. 17, 1976

Related U.S. Application Data

[63] Continuation of Ser. No. 607,693, Aug. 25, 1975, abandoned, which is a continuation of Ser. No. 447,633, Mar. 4, 1974, abandoned.

[30] Foreign Application Priority Data

Mar. 3, 1973 Japan .................................. 48-25519

[51] Int. Cl.$^2$ ............................................. B01D 15/06
[52] U.S. Cl. ......................................... 210/33; 210/35
[58] Field of Search .................. 210/33, 35, 189, 275, 210/276, 277, 278, 279

[56] References Cited

U.S. PATENT DOCUMENTS

| | | | |
|---|---|---|---|
| 2,855,364 | 10/1958 | Roberts ................................. | 210/275 |
| 3,130,151 | 4/1964 | Levendusky ........................... | 210/33 |
| 3,240,699 | 3/1966 | Duff et al. ............................. | 210/275 |
| 3,459,306 | 8/1969 | Kanamori et al. .................... | 210/189 |
| 3,595,784 | 7/1971 | Butterworth .......................... | 210/189 |
| 3,875,053 | 4/1975 | Siegers ................................... | 210/35 |

*Primary Examiner*—Wilbur L. Bascomb, Jr.
*Assistant Examiner*—Ivars Cintins
*Attorney, Agent, or Firm*—Cooper, Dunham, Clark, Griffin & Moran

[57] ABSTRACT

In a fixed-bed solid-fluid contacting process, wherein adsorption and regeneration are performed in countercurrent flow, a portion of contaminated solid particles in the bed is extracted from the bed for washing, simultaneously when a fluid is treated by passing through the bed. The solid particles extracted are washed and recycled to the bed at the time of other operations, for example, regeneration step. The process is improved in the time cycle of treatment which is shortened and the pressure loss which is decreased. The process is also free from disturbance of bed and excellent in treatment efficiency. A simple and compact apparatus is available for the process. Typical example of application is ion exchange reaction.

5 Claims, 2 Drawing Figures

SOLID-FLUID CONTACTING PROCESS

This is a continuation of application Ser. No. 607,693 filed Aug. 25, 1975, which is in turn a continuation of Application Ser. No. 447,633 filed Mar. 4, 1974, both now abandoned.

This invention relates to an improvement of countercurrent fixed-bed process for contacting solid with fluid.

Solid-fluid contacting processes of prior art may largely be classified into two groups, namely continuous process and fixed-bed processes, the latter including cocurrent and countercurrent processes. For example, with reference to ion exchange processes, continuous ion exchange process wherein adsorption and regeneration are performed simultaneously in different parts of the equipment (hereinafter referred to as "continuous process"), cocurrent fixed-bed ion exchange process wherein adsorption and regeneration are performed in parallel flow (hereinafter referred to as "cocurrent process") and countercurrent fixed-bed process wherein adsorption and regeneration are performed in countercurrent flow (hereinafter referred to as "countercurrent process") are known.

In continuous process, adsorption, regeneration and washing are performed in different parts of equipment, wherein operations optimized for respective functions are conducted at steady state, to the advantages of a smaller consumption of regenerant and high purity of treated water. On the other hand, this process involves drawbacks in adaptability for the amount or the composition of water to be treated, such that construction cost is relatively high when the amount of water to be treated per hour is small.

In cocurrent process, adsorption, regeneration and washing are performed in one apparatus. Construction cost for a small scale equipment is relatively low and therefore this process can be practiced very easily. However, because adsorption and regeneration are performed in parallel flow, consumption of regenerant is relatively high. Furthermore, this process has a vital defect that the purity of treated water is low.

In countercurrent process, adsorption, regeneration and washing are ordinarily performed in one apparatus as in cocurrent process. The countercurrent process nevertheless proved to be improved greatly in consumption of regenerant and purity of treated water which are deficient in cocurrent process. In industrial practice of the countercurrent process, however, great difficulties are encountered in performing a cycle of operations of adsorption, regeneration and washing while keeping the bed in a fixed state. Washing is ordinarily performed by flowing water in ascending direction (hereinafter referred to as "back wash") to expand ion-exchange resins (hereinafter referred to as "resins"), thereby removing, from the top, fine particles of wasted resins and impurities adhered to resins which are brought about from outside by, for example, water to be treated. The most prominent feature of countercurrent process is lost if the aforesaid back wash operation is performed in every cycle. Hence, in practical operations, frequency of back wash is extremely decreased. As the result, this causes increase in flowing resistance of fluid to make sufficient amount of fluid transportation difficult. Decrease in frequency of back wash cannot be applied when water to be treated or regenerant contain much amount of impurities.

In addition, countercurrent process involves another problem of disturbance of bed, because regeneration or adsorption is performed in ascending direction. There are many proposals to solve this problem. Typical examples are (1) to use balance water flowing in from the top of apparatus toward the upper surface of bed and flowing out therefrom through a collector, while performing simultaneously regeneration or adsorption; and (2) to seal a gas such as air in the upper space of the apparatus. In the former method (1), adjustment of the position of the collector relative to the bed surface is difficult. If the collector is located too much below the bed surface, unused resins are increased in amount, while disturbance of bed takes place if it is located too much upper the bed surface. This method is hardly applicable when expansion or shrinkage of resins takes place during fluid flowing in ascending direction. Similar difficulties also remain to be solved in application of the method (2).

In order to overcome the drawbacks as mentioned above, there is also proposed a system wherein the main column is equipped at the top with a wash column which is connected by a valve. Adsorption and regeneration are performed in the main column packed completely with the resins. At the time of back wash, the aforesaid valve is opened to permit introduction of expanded resin into the wash column. Even in this system, resins are expanded when they are introduced into the wash column to cause disturbance of bed, whereby prominent feature of countercurrent process is lost. Furthermore, only a limited portion of the resins present near the top of the main column can be subjected to back wash, because the outlet and the inlet of the resins are exactly the same. As the result, fine particles of wasted resins and impurities brought about from outside by, for example, water to be treated are accumulated in the resin which are not subjected to back wash to cause increase in flowing resistance of fluid.

The object of the present invention is to provide an improved solid-fluid contacting process.

According to the present invention, there is provided a fixed-bed solid-fluid contacting process, comprising passing a fluid to be treated through a treatment zone packed with solid particles in one direction, regenerating the solid particles on depletion in activity by passing a fluid for activation in a direction opposite to the flowing direction of the fluid to be treated, washing the solid particles of contamination by extracting a portion of the solid particles simultaneously with the passing of the fluid to be treated through an outlet arranged in a position opposite to the flowing direction of the fluid to be treated to transport into a washing zone which is furnished separately from the said treatment zone to wash the solid particles and recycling the washed solid particles into the said treatment zone.

Figure 2:
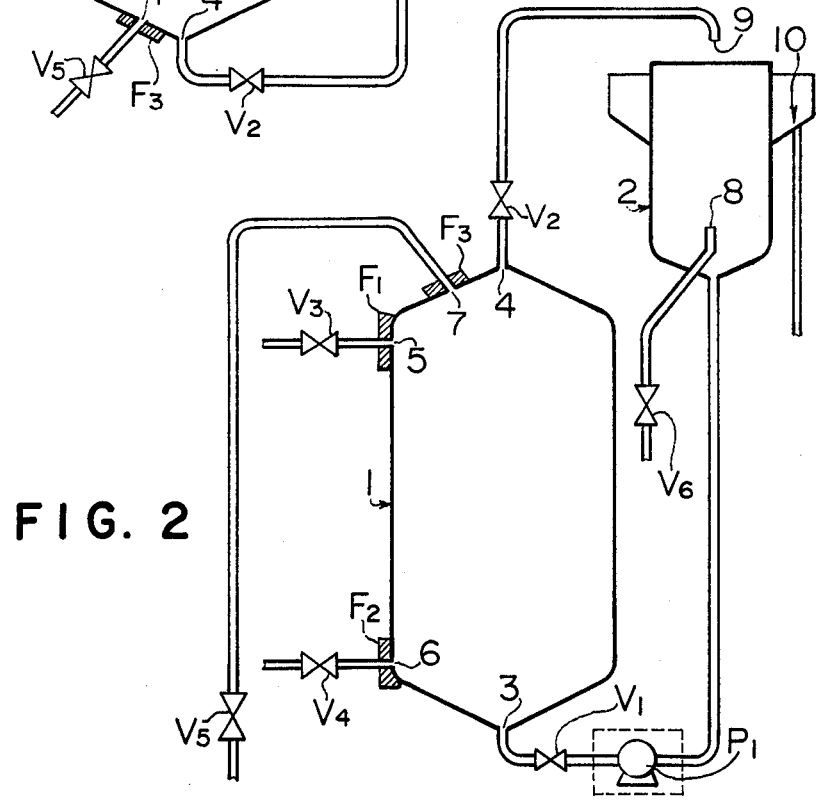

Referring now to the annexed drawings, which are shown for the purpose of illustrating the process of the present invention, FIG. 1 is a schematic drawing showing one example of apparatus which may be used for practicing a preferred embodiment of the present invention and FIG. 2 a schematic drawing showing another example of apparatus.

In both drawings, 1 shows main column for contacting solid with fluid; 2 wash column; 3 inlet of washed resins; 4 outlet of contaminated resins; 5 inlet of fluid to be treated; 6 outlet of treated fluid; 7 vent for fluid to be treated; 8 inlet of back wash fluid; 9 inlet of contaminated resins; 10 vent for back wash fluid; $V_1$ washed resins inlet valve; $V_2$ contaminated resins outlet valve; $V_3$ inlet valve for fluid to be treated; $V_4$ outlet valve for treated fluid; $V_5$ vent valve for fluid to be treated; and $V_6$ inlet valve for back wash fluid, respectively. $F_1$, $F_2$ and $F_3$ are filters which permit flowing of fluid but bar flowing of resins. $P_1$ shows a slurry pump which may optionally be equipped. The apparatus as shown in FIG. 1 is suitable for the process wherein fluid to be treated is flown in ascending direction, while the apparatus as shown in FIG. 2 for descending flow process.

The general operational procedure according to the process of the present invention will now be explained by referring, for example, to ion exchange.

First, the main column 1 is filled with resins in an amount such that it can sufficiently hold the bed under a flow velocity suitable for ion exchange reaction and maximum volume of resins swelled in the course of adsorption, regeneration or displacement is less than the volume of the main column.

Regeneration is performed by charging regenerant through the valve $V_4$ and discharging used regenerant through the valve $V_3$.

Ion exchange is performed by charging a fluid to be treated through the valve $V_3$ and discharging treated fluid through the valve $V_4$. The treated liquid is collected after desired purity is attained. At the time of flowing liquid to be treated, the valve $V_2$ is opened to transport a desired amount of contaminated resins to the wash column 2 by the pressure conditions in the main column 1. The contaminated resins at bottom (FIG. 1) or top (FIG. 2) are backwashed in the wash column with fluid to be treated, or otherwise water, sea water, if it is effective, or regenerant, and thereafter left to be settled. When the purity of the treated fluid is lowered to break through point, flowing of the fluid to be treated is stopped and the valve $V_5$ is opened. At the same time, the valve $V_1$ is opened to receive washed resins, while discharging the fluid to be treated through the valve $V_5$. The washed resins may be transported by means of a slurry pump as shown in FIG. 2. Then, the step of regeneration is commenced to repeat the cycle. At the time of regeneration, no resin is extracted from the main column 1.

Introduction of washed resins into the main column need not be performed at the time of discharging the fluid to be treated, but may otherwise be performed at the time of adsorption, regeneration or optional displacement operation by fluid column pressure or pump pressure. The position of the inlet of the washed resins is not limited to top (FIG. 1) or bottom (FIG. 2), but may be at any suitable place at the side of the main column different from the outlet of the contaminated resins.

The amount of resins extracted and frequency of extraction may be varied widely and determined suitably according to the extent of contamination or abrasion of the resins. The amount of resins extracted is preferably from 5 to 50% by weight based on the total weight of the resins. Although frequency of extraction decreased to, for example, 20 cycles/extraction may be operable in some cases, extraction is preferably performed per every cycle to avoid channelling and increase in pressure drop through the resin layer.

The advantages of the process according to the present invention when it is applied to ion exchange are as follows:

(a) Because contaminated resins can be extracted and the washed resins can be received without disturbing the bed in the main column, the characteristic of countercurrent system can be realized to its full extent to the advantages of small consumption of regenerant and high purity of the treated fluid.

(b) Treatment of a fluid contaminated to a greater extent is possible without preceding use of a filtration apparatus, because back wash of the contaminated resins can be performed in every cycle. The main column requires no space for back wash and, since the separate wash column is equipped for the purpose of washing contaminated resins only, the apparatus as a whole may be simple and compact to the advantage of cheaper construction cost. Furthermore, the treatment procedure requires no particular time cycle for back wash.

(c) Because the resins, which are extracted from the main column and subjected to back wash, are recycled to the main column through the inlet opposite to the extraction outlet, transportation of resins takes place frequently, preferably in every cycle, in the direction from the cross section of the main column at the recycle inlet to that at the extraction outlet. As the transported resins are necessarily subjected to back wash, there takes place no accumulation of fine particles of abraded resins or impurities brought about by the fluid to be treated and therefore operation can be performed stably with low flowing resistance of fluid.

The process according to the present invention is practiced analogously on the basis of the same principle in various applications, other than ion exchange reaction, wherein adsorption, desorption or other reaction between solid and fluid occurs.

The present invention is further explained by referring to the following Examples.

EXAMPLE 1

The process of the present invention is applied for an apparatus for production of pure water by deionization, wherein an industrial water is passed through a cation exchange column, a decarbonization column and an anion exchange column, successively. Regeneration is performed in descending flow. For comparison with the prior art, treatment is also performed by a cocurrent system wherein packed resins height and the regeneration level is the same.

| Ion exchange resins | |
|---|---|
| Cation | commercially available strong acidic cation resin |
| Anion | commercially available strong basic anion resin |
| Quality of water to be treated | |
| Cation | 140 ppm (as $CaCO_3$) |
| Anion | 97 ppm (as $CaCO_3$) |
| $SiO_2$ | 21 ppm (as $SiO_2$) |
| Regeneration level | |
| Cation | 73 g HCl/liter-resin |
| Anion | 100 g NaOH/liter-resin |
| Packed resins height | |
| 1 m (both cation and anion) | |
| Amount of resins recycled (present process) | |
| Cation | 5 liter/cycle |
| Anion | 7 liter/cycle |

The results obtained by both treatment methods are shown in Table 1.

Table 1

| | Cocurrent process | Process of the invention |
|---|---|---|
| Deionization tower: | | |
| Cation | 252 mm in diameter 1400 mm in height | 240 mm in diameter 1100 mm in height |
| Anion | 320 mm in diameter 1400 mm in height | 303 mm in diameter 1100 mm in height |
| Amount of packed resins: | | |
| Cation | 50 liter | 50 liter |
| Anion | 80 liter | 79 liter |
| Amount of water treated | 16800 liter/cycle | 2000 liter/cycle |
| Amount of regenerant: | | |
| HCl | 3.65 kg/cycle | 3.29 kg/cycle |
| NaOH | 8.0 kg/cycle | 7.2 kg/cycle |
| Time cycle: | | |
| Ion exchange | 8 hours | 8 hours |
| Regeneration and washing with wter | 2 hours | 1 hour 59 minutes 30 seconds |
| Back wash | 1 hour | 0 |
| Fluid discharge | 0 | 30 seconds |
| Purity of treated water | | |
| Electric conductivity | 5 μv/cm | 2 μv/cm |
| $SiO_2$ | 0.12 ppm | 0.05 ppm |

EXAMPLE 2

A highly contaminated wasted water from a factory is passed without any pretreatment such as filtration through cation resins packed in an ion exchange apparatus according to the process of the present invention. Frequency of extraction and washing of resins is varied.

| Ion exchange resin | commercially available strong acidic cation resins |
|---|---|
| Quality of water to be treated | |
| Cation | 210 ppm (as $CaCO_3$) |
| Anion | 170 ppm (as $CaCO_3$) |
| Turbidity | 4.3 |
| Amount of water to be treated | |
| 8000 liter/cycle | |
| Amount of regenerant | |
| 1.8 kg HCl/cycle | |
| Deionization column | |
| Diameter | 160 mm |
| Height | 1100 mm |
| Amount of packed resins | |
| Deionization column | 20 liter |
| Wash column | 8 liter |
| Amount of resins recycled | |
| 5 liter/cycle | |
| Time cycle | |
| Ion exchange | 10 hours |
| Fluid discharge | 30 seconds |
| Regeneration and washing with water | 1 hour 59 minutes 30 seconds |

Purity of treated water obtained under the above conditions is 4 μv/cm to 5 μv/cm in terms of electric conductivity (after passing through anion exchange resins) and turbidity of treated water is from 0.5 to 1.1. During these operations, frequency of extraction of resins is varied to see the change in pressure loss through the resin layer. The result is shown in Table 2.

Table 2

| Frequency of extraction of resins (cycles/extraction) | Pressure loss (m $H_2O$) |
|---|---|
| 1 | 2.8 |
| 5 | 3.1 |
| 10 | 4.4 |
| 20 | 8.1 |

As apparently seen from the results as set forth above, stable operation can be performed under the condition of a small pressure loss, particularly by extracting resins in every cycle even when the fluid to be treated is highly contaminated as in this Example; treatment of such a fluid to be treated by the prior art countercurrent procedure in the absence of pre-treatment such as filtration increases frequency of back wash so much that the advantage in operations of countercurrent process is lost.

EXAMPLE 3

An underground brine is softened by passing through ion exchange resin layer according to the process of the present invention. Sea water is used as regenerant for ion exchange resins adsorbing hardness components. The water to be treated is flown in ascending direction, and the regenerant in descending direction.

| Ion exchange resin | commercially available strong acidic cation resin |
|---|---|
| Quality of water to be treated | |
| Cation | 500 ppm (as $CaCO_3$) |
| Ca + Mg | 350 ppm (as $CaCO_3$) |
| Amount of water to be treated | |
| 7000 liter/cycle | |
| Ion exchange column | |
| Diameter | 250 mm |
| Height | 1100 mm |
| Amount of packed resins | |
| Ion exchange column | 50 liter |
| Wash column | 15 liter |
| Amount of resins recycled | |
| 10 liter/cycle | |
| Velocity of water to be treated | |
| LV 60 m/hour | |
| Amount of regenerant | |
| 1250 liter/cycle | |

The hardness components of the treated water obtained under the above conditions are as follows:
Ca: 0.1 ppm or less
Mg: 0.61 ppm In this operation, sea water which is regenerant is used as washing liquid in wash column, and therefore regeneration of the resins in the wash column is also effected by washing the resins, while performing ion exchange in the ion exchange column. Thus, when sea water is used as regenerant, stable operation is possible with no danger of precipitation of $CaSO_4$ in the step of regeneration by varying the amount of the resins recycled according to the hardness components and the break through capacity of the resin, even when a resin having increased break through capacity may be used.

EXAMPLE 4

Benzoic acid contained in an aqueous solution of a polymeric surfactant is removed by passing through activated charcoal layer. The fluid to be treated is passed through activated charcoal layer according to the process of the present invention, thereby effecting adsorption of benzoic acid. After displacement with water, regeneration is performed by an aqueous NaOH solution, followed by rinising with water, then with acid and further with water. The fluid to be treated is in descending flow and regenerant in ascending flow.

```
Fluid to be treated
    Polymeric surfactant    5%
    Benzoic acid            1%
    Viscosity               30 cp.
Activated charcoal column
    Diameter    700 mm
    Height      1300 mm
Amount of treated fluid
    1200 liter/cycle
Amount of packed activated charcoal
    400 liter
Amount of regenerant
    2H-NaOH    1 m³/cycle
Rinsing acid
    2N-H₂SO₄   1 m³/cycle
Amount of activated charcoal recycled
    50 liter/cycle
```

The concentration of benzoic acid in the treated fluid obtained under the above conditions is 10 ppm and the pressure loss is 5 m H₂O.

EXAMPLE 5

Raw water is passed through cation resin layers in the ion exchange apparatus to which the present process is applied and in that of prior art countercurrent system, respectively, followed by passing hydrochloric acid for regeneration. In production of decationized water, wherein the above cycle of so called adsorption-regeneration operation is repeated, comparison is made between the process of the present invention and that of prior art with respect to the amount of treated water in relation to frequency of back wash. In the countercurrent process of prior art, back wash operation is performed by expansion of the packed resin layer which is common in the conventional methods.

```
Conditions
Ion exchange resin:        commercially available
                           strong acid cation resin
Ion exchange column:       160 mm in diameter
Raw water:                 total cation of 80 ppm
                           (as CaCO₃); Na 23%
Regenerant:                33% HCl, 5.9 kg/cycle
Amount of resins recycled
in the present process:    4 liter/cycle
```

The end point of treatment of raw water is determined when Na in the treated water is 2 ppm.

The results of comparative tests between the countercurrent process of prior art and the process of the present invention which are conducted under the above conditions are set forth in Table 3.

As clearly seen from the result, the process of the present invention is advantageous in that it is larger in the amount of treated water per one cycle and shorter in time cycle by the difference in the time required for back wash than the prior method.

Table 3

| Frequency of back wash (cycles/one back wash) | Average amount of treated water (liter/cycle) | |
|---|---|---|
| | Prior method | Process of the present invention |
| 2 | 12,600 | 16,100 |
| 4 | 14,200 | 16,100 |
| 6 | 15,200 | 16,100 |

What we claim is:

1. In a solid fluid contacting process which comprises passing a fluid to be treated in one direction through a treatment zone which is initially substantially filled with active solid particles and regenerating the solid particles upon depletion of activity thereof by passing a regenerating fluid throughout said treatment zone in a direction opposite to the direction of flow of the fluid to be treated, the improvement which comprises removing from 5% to 50% by weight of the solid particles based on their total weight during the passage of the fluid to be treated through an outlet which is positioned upstream of the direction of flow of the fluid to be treated, transporting said removed solid particles to a backwash zone which is separate from the treatment zone, backwashing said removed solid particles and recycling the backwashed solid particles to the treatment zone to substantially fill said treatment zone with said solid particles prior to a subsequent treatment step.

2. A process according to claim 1, wherein the solid particles are ion exchange resins.

3. A process according to claim 1, wherein the solid particles are removed and replaced at opposite ends of the treatment zone.

4. A process according to claim 1, wherein a portion of the solid particles is removed during each treatment cycle.

5. A process according to claim 1, wherein the washed solid particles are recycled to the treatment zone prior to a regeneration cycle.

* * * * *